United States Patent
Hähnel et al.

(10) Patent No.: US 6,457,621 B1
(45) Date of Patent: Oct. 1, 2002

(54) DEVICE FOR SEPARATING THE ROD AND CAP OF A CONNECTING ROD BY BREAKING

(75) Inventors: Michael Hähnel, Essingen; Horst Wisniewski, Reutlingen, both of (DE)

(73) Assignee: Alfing Kessler Sondermaschinen GmbH (DE)

( * ) Notice: Subject to any disclaimer, the term of this patent is extended or adjusted under 35 U.S.C. 154(b) by 0 days.

(21) Appl. No.: 09/463,826
(22) PCT Filed: Jul. 16, 1998
(86) PCT No.: PCT/EP98/04433
§ 371 (c)(1),
(2), (4) Date: Apr. 10, 2000
(87) PCT Pub. No.: WO99/06169
PCT Pub. Date: Feb. 11, 1999

(30) Foreign Application Priority Data

Aug. 1, 1997 (DE) .......................... 197 33 433

(51) Int. Cl.⁷ ................................. B26F 3/02
(52) U.S. Cl. ................. 225/103; 225/100; 225/105; 29/888.09
(58) Field of Search ................. 225/103, 104, 225/105, 97, 100, 101; 29/888.09, 888.091, 88.092

(56) References Cited

U.S. PATENT DOCUMENTS

| 3,951,083 A | * | 4/1976 | Hortig |
| 4,768,694 A | * | 9/1988 | Fabris et al. |
| 4,860,419 A | * | 8/1989 | Hekman |
| 5,105,538 A | | 4/1992 | Hoag et al. .............. 29/888.09 |
| 5,169,046 A | * | 12/1992 | Miessen et al. |
| 5,263,622 A | * | 11/1993 | Henzler et al. |
| 5,320,265 A | * | 6/1994 | Becker |
| 5,353,500 A | * | 10/1994 | Hoag et al. |
| 5,503,317 A | * | 4/1996 | Jones et al. |
| 5,699,947 A | * | 12/1997 | Cavallo et al. |
| 5,878,323 A | * | 3/1999 | Sakai et al. |
| 5,911,349 A | * | 6/1999 | Wiesemann et al. |
| 5,974,663 A | * | 11/1999 | Ikeda et al. |

FOREIGN PATENT DOCUMENTS

| DE | 40 22 860 A1 | 1/1992 |
| DE | 43 16 254 A1 | 11/1994 |
| EP | 0 396 797 A1 | 5/1989 |
| EP | 0 467 198 A1 | 7/1991 |
| EP | 0 568 119 A2 | 11/1991 |

* cited by examiner

*Primary Examiner*—Boyer Ashley
*Assistant Examiner*—Thomas J Druan, Jr.
(74) *Attorney, Agent, or Firm*—Taylor & Aust. P.C.

(57) ABSTRACT

A device for separating the rod and cap of a connecting rod by breaking includes a fixed expansion mandrel half on a fixed device part a mobile expansion mandrel half on a device part which moves in the direction of expansion, and support elements for the rod and the cap. The device has a long service life without operational problems and can separate the rod and cap of a connecting rod from each other with a high degree of precision. To this end, the adjustable support elements are arranged on the fixed device part and the fixed support elements are arranged on the mobile device part.

17 Claims, 4 Drawing Sheets

DEVICE FOR SEPARATING THE ROD AND CAP OF A CONNECTING ROD BY BREAKING

BACKGROUND OF THE INVENTION

1. Field of the Invention

The present invention relates to an apparatus for crack splitting a rod (shaft) and a big-end cap of a connecting rod, including a fixed expander mandrel half on a fixed part of the apparatus, a movable expander mandrel half on a part of the apparatus movable in the expanding direction and including supporting elements for rod and cap.

2. Description of the Related Art

Known from European patent document no. EO 0 396 797 is an apparatus for crack splitting rod and cap, including advanceable supporting elements on both the movable and fixed parts of the apparatus. In this known art, the advanceable supporting elements are formed by set screws (illustrated symbolically as grub screws). Turning the set screws permits advancing the supporting elements to clamp the connecting rod to be split relative to the fixed and movable expander mandrel halves in the apparatus. Experience has shown that clamping in place the connecting rod to be split, especially to prevent it from turning out of place, is necessary to achieve a defined crack with no negative bending effects.

With the advanceable supporting elements, it is also possible to set the apparatus for crack splitting rod and cap of connecting rods of various sizes. In addition, with the advanceable supporting elements, differences due to manufacturing tolerances can also be compensated for.

To achieve speedy adaptation, it is known to use powered advanceable supporting elements. In the case of both manual set screws and powered advanceable supporting elements, there is the problem that the advanceable supporting elements provided on the movable part of the apparatus are exposed to shock and vibration that is inherently involved in the crack splitting. Thus, in splitting, the two expander mandrel halves are usually urged apart with the aid of a cleaving wedge. This movement and splitting of the cap from the rod occurs abruptly. In addition, the movable part of the apparatus impacts a stop at which the movement of the movable part of the apparatus is halted. Powered advanceable supporting elements are especially heavily stressed by this action, resulting in problems with proper functioning and long useful life.

SUMMARY OF THE INVENTION

The present invention provides an apparatus for crack splitting the rod (shaft) and big-end cap of a connecting rod. The apparatus has a long useful life with no functioning problems. With the apparatus, the rod and the big-end cap of a connecting rod can be split with high precision. The advanceable supporting elements are arranged on a fixed part of the apparatus and the fixed supporting elements are arranged on the movable part of the apparatus.

In the present invention, the advanceable supporting elements, automatically exposed to more stress, are provided on the fixed part of the apparatus to thus significantly reduce the problems involved in reliable functioning and long useful life. This is particularly important where use is made of powered advanceable supporting elements, which are usually powered by pneumatic or hydraulic cylinders or by electric motor drives which are not only in themselves sensitive to shock and vibration but also incorporate flexible input and output tubing for supply and control. Flexible input and output tubing in pneumatic, hydraulic or electric motor drives are particularly sensitive to shock and vibration and cyclic stresses of reciprocating operation. Arranging these sensitive parts on the fixed part of the apparatus in accordance with the invention avoids the resulting loads and at least the influence of direct shock and vibration which is particularly damaging to flexible tubing and electric wiring.

Since the big-end caps of connecting rods always need to have outer contact surface areas for the bolts for connecting rod and cap, the cap can be supported particularly effectively at these contact surface areas. In one embodiment of the present invention, the fixed part of the apparatus is equipped to mount the cap and the movable part of the apparatus is equipped to mount the rod. In this arrangement, the rod is held particular simply and effectively in the apparatus when at least one fixed supporting element is formed by a locating peg for mounting the small-end bore of the rod.

As an alternative, the fixed supporting element may also be formed by a recess at least partially contacting suitable portions of the outer surface area of the rod end (small-end).

One particularly effective feature of the advanceable supporting elements is that they contact at least one shiftable wedge element substantially transversely to the advance movement. Such an arrangement enables a particular rigid arrangement to be achieved for loading. Advantageously in this arrangement, two supporting elements are provided and a wedge element is assigned to each supporting element. Thus, it is possible to benefit from the advantages of wedge actuation whilst simultaneously clamping the connecting rod reliably in place at two opposite locations.

By adapting the advance movement of each supporting element to uniformly clamp in place the connecting rod to be split, both wedge elements include wedge surface areas having an identical angle of attack. This thus achieves for both supporting elements an identical advance movement in such a configuration when both wedge elements are shifted by the same amount.

Production tolerance inaccuracies on the part of the connecting rod to be supported can be compensated for in that two advanceable supporting elements are provided, each of which can be advanced independently of the other. Due to the two supporting elements, each advanceable independently of the other, each connecting rod part to be fixedly secured can be individually set.

Auto-centering by actuating the wedge elements is simply achieved in that the wedge surface areas of the wedge elements are arranged opposite in angle of attack. Further, a hydraulic or pneumatic cylinder is provided whose face cooperates with the one wedge element and whose piston cooperates with the other wedge element. However, a particularly effective actuation of the advanceable supporting elements is also achievable by direct-acting hydraulic cylinders. This enables each supporting element in such a case to be connected to the piston rod of a supporting piston. This connection is configured to advantage such that each of the supporting elements may be arranged directly at the front end of the piston rod of the pistons.

For loading the connecting rods into the crack splitting apparatus, a loading device holds the crack splitting apparatus substantially stationary whilst the connecting rods are inserted therein. In such a configuration, the pneumatic or hydraulic cylinders or the electric motor drives including the feed and discharge lines for supply and control can be stationary whilst loading is achieved exclusively by moving the connecting rod.

There are basically two possibilities available for the loading arrangement. In the one possibility, a transport device may be arranged above the stationary apparatus for overhead insertion/removal of the connecting rod into/from the apparatus. In the other possibility, a clocked transport device is provided under the stationary apparatus from which the connecting rod is picked out for insertion into the apparatus, held in the apparatus during crack splitting, and then lowered back into the transport device.

To protect the sensitive drive system including the feed and discharge lines from indirect shock and vibration, the apparatus is mounted on a baseframe via shock absorbers.

BRIEF DESCRIPTION OF THE DRAWINGS

Embodiments of the invention will now be detailed for further explanation and a better understanding of the invention with reference to the attached drawings in which.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
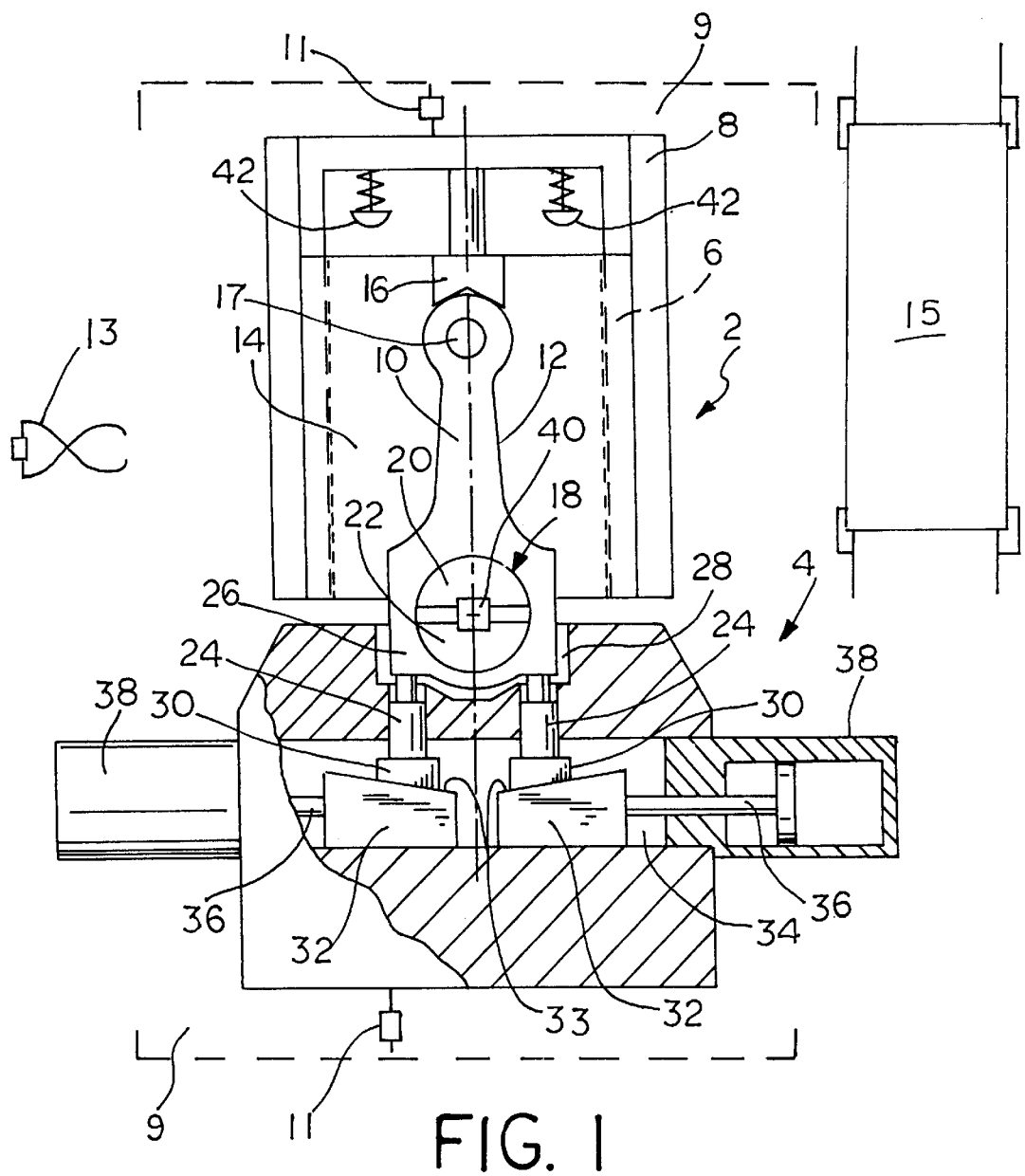
FIG. 1 is a schematic, partially sectioned plan view of a first embodiment of the apparatus in accordance with the invention.

Referring now to FIG. 1, there is illustrated the first embodiment of an apparatus in accordance with the invention including a movable part 2 and a fixed part 4 of the apparatus. The movable part 2 of the apparatus is guided longitudinally on a frame 8 via guides 6, shown schematically, so that the movable part 2 of the apparatus reciprocates on the frame 8 like a slide. The frame 8 as well as the fixed part 4 of the apparatus are held secured in place on a common baseframe 9 via shock absorbers 11.

Arranged above the apparatus is a transport device 13 for inserting the connecting rods 12 into the apparatus from above and for removing them likewise from above. Alternatively, or additionally, a clocked transport device 15 is provided under the apparatus from which the connecting rods 12 are lifted for insertion into the apparatus, held in the apparatus during crack splitting, and then lowered back into the transport device 15.

Figure 4:
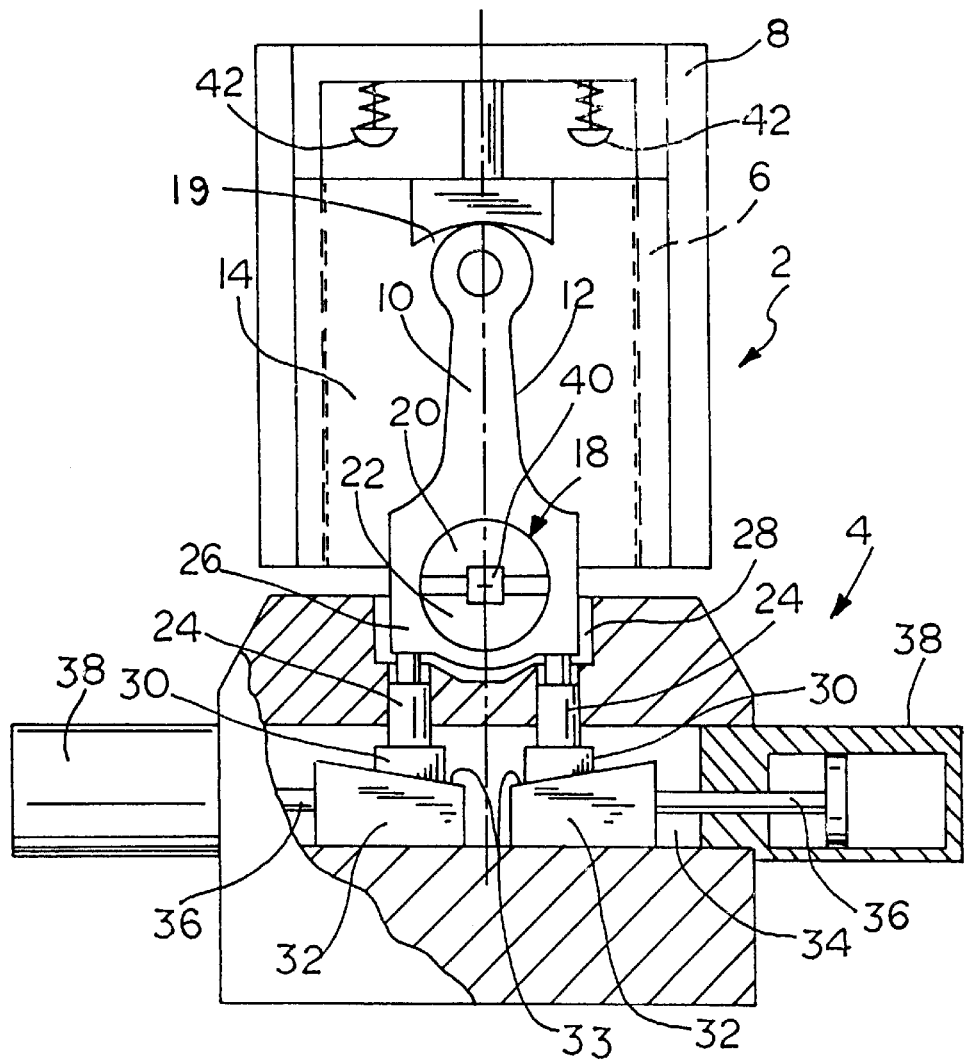
FIG. 4 is a schematic, partially sectioned plan view of a fourth embodiment of the apparatus in accordance with the invention.

Retained in the movable part 2 of the apparatus is a rod 10 of a connecting rod 12 to be split. For this purpose, the movable part 2 of the apparatus includes a substantially flat retaining surface area 14 on which the connecting rod 12 rests. Furthermore, the movable part 2 of the apparatus includes a supporting element, which in this case is configured as a V-block 16 (prism holder) whose retaining surface areas are at least partly in contact with the outer surface area of the connecting rod small-end of the rod 10. As an alternative, the rod 10 may be locked to prevent it from turning out of place by a fixed pin or peg 17 protruding into the small-end bore of the connecting rod. As another alternative, the supporting element may be in the form of a recess 19 (FIG. 4) contacting portions of the outer surface of the small-end of rod 10.

Engaging a bore 18 of the connecting rod 12 are two expander mandrel halves 20, 22. The expander mandrel half 20 is secured to the movable part 2 of the apparatus and protrudes beyond the retaining surface area 14. Accordingly, the connecting rod 12 to be split is retained in the region of the rod, on the one hand, by the V-block 16 protruding beyond the retaining surface area 14 and, on the other hand, by the expander mandrel half 20.

On the fixed part 4 of the apparatus, the connecting rod 12 to be split is clamped in place between the expander mandrel half 22 and two advanceable supporting elements which are spaced away from each other. In the present example, the supporting elements are formed by two pins 24 guided in the longitudinal direction of the connecting rod 12 to be split. As evident from FIG. 1, the two pins 24 engage the surface areas of a big-end cap 26 of the connecting rod 12. These contact surface areas are needed in later assembly of the connecting rod 12 for joining rod and big-end cap together for contacting the heads of the tie-bolts.

It is evident from FIG. 1 that the big-end cap 26 of connecting rod 12 is clamped in place merely between the expander mandrel half 22 and the two pins 24. The fixed part 4 of the apparatus includes in the region of the cap 26 a recess 28 into which the big-end cap 26 of the connecting rod 12 can be easily inserted when the pins 24 are retracted.

Whilst the front face of the advanceable pins 24 is in contact with the cap 26, the rear ends of the pins 24 are flared into respective contact pieces 30. Each contact piece 30 contacts a wedge element 32 via its wedge surface area 33. Each wedge element 32 is shiftingly held in a recess 34 oriented substantially perpendicular to the longitudinal axis of the connecting rod 12 and supported at the surface of the recess 34 relative to the fixed part 4 of the apparatus. Each wedge element 32 cooperates via a piston rod 36 with a double-ended hydraulic cylinder 38.

To split the big-end cap 26 from the rod 10 of a connecting rod 12, connecting rod 12 is mounted by its bore 18 on the adjoining expander mandrel halves 20, 22. In this arrangement, the connecting rod 12 is oriented so that the outer surface area of the rod-end is inserted in the V-block 16. After this, the connecting rod 12 is clamped in place. For this purpose, the hydraulic cylinders 38 are energized so that the two wedge elements 32 are moved towards each other. The contact pieces 30 slide on the inclined wedge surface area 33. This results in the guided pins 24 being advanced in the direction of the connecting rod 12. Due to the connecting rod 12 being defined between the V-block 16 and the two expander mandrel halves 20, 22, the connecting rod 12 is arranged such that the front faces of the pins 24 are urged against the contact surface areas of the big-end cap 26.

To uniformly clamp the connecting rod 12 in place between the expander mandrel half 22 and the pins 24, the hydraulic cylinders 38 can be energized individually. By sensing the internal pressure in each hydraulic cylinder 38, the force with which each pin 24 is urged against the cap 26 can be controlled. This makes possible a uniform clamping in place of the connecting rod 12.

Once the connecting rod 12 has been inserted into the apparatus and clamped in place via the pins 24, the actual splitting follows, as is known. For this purpose, a cleaving wedge 40 disposed between the expander mandrel halves 20, 22 is powered forwards to part the two expander mandrel halves 20, 22 from each other. On rupture of the joint between rod 10 and cap 26, the movable part 2 of the apparatus distances itself from the fixed part 4 of the apparatus abruptly. This sudden movement is cushioned by spring stops 42 secured to the frame 8.

The connecting rod, now split, can be removed from the apparatus. This first requires the wedge elements 32 to be retracted via the hydraulic cylinders 38 to release the tension on the cap 26. After this, the rod 10 and the cap 26 can be lifted out of the apparatus either manually or automatedly.

Figure 2:
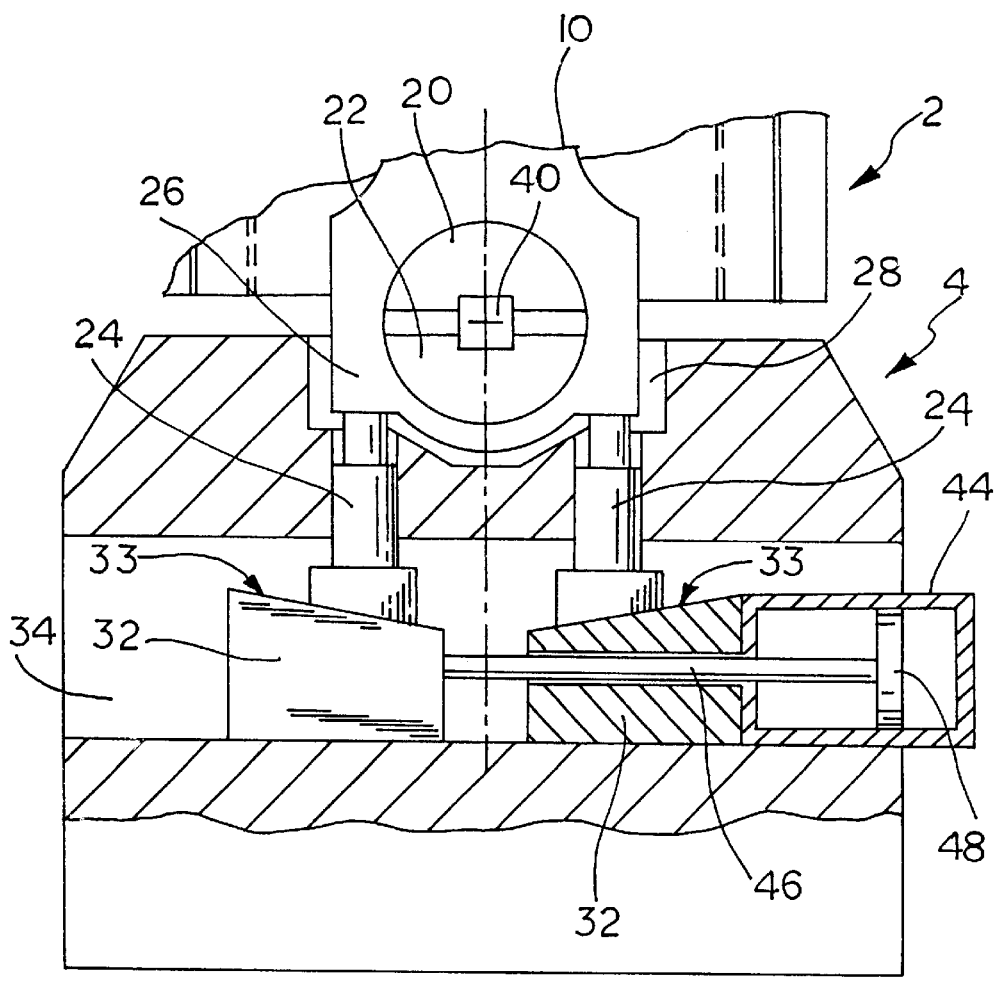
FIG. 2 is a schematic, partially sectioned detail view of a second embodiment of the apparatus in accordance with the invention.

Referring now to FIG. 2, there is illustrated a second embodiment of the present invention on a magnified scale. The embodiment as shown in FIG. 2 differs substantially from the embodiment as shown in FIG. 1 by the two wedge elements 32 being powered by a common hydraulic cylinder 44. In the embodiment as shown in FIG. 2, the hydraulic cylinder 44 is fixedly connected to a wedge element 32, whereas the other wedge element 32 cooperates with the hydraulic cylinder 44 by a piston rod 46 which penetrates the first wedge element and is connected to a piston 48 sealed in the cylinder 44.

The two wedge surface areas 33 in the embodiment shown have an identical angle of attack relative to the sliding plane of the wedge elements 32. In addition, the wedge elements 32 are disposed opposingly inclined relative to each other.

Advancing the pins 24 to clamp the big-end cap 26 in place results in the two wedge elements 32 being moved towards each other. This advance movement actuation is possible with the aid of just a single hydraulic cylinder 44. Due to the geometry of the hydraulic cylinder 44, a substantially identical advancing force acts on the two wedge elements 32. In this arrangement, this simple design feature ensures that each of the two pins 24 is in contact with the cap 26 with identical force.

To release the tension on the cap 26 once it has been split from the rod 10, the two wedge elements 32 are forced away from each other by actuation of the cylinder 44. Stops (not shown) defining this movement of the wedge elements 32 prevent one wedge element 32 being shifted whilst the other wedge element 32 remains in place. This thus ensures that both pins 24 are distanced from the expander mandrel half 22 to make room for inserting a new connecting rod.

Figure 3:
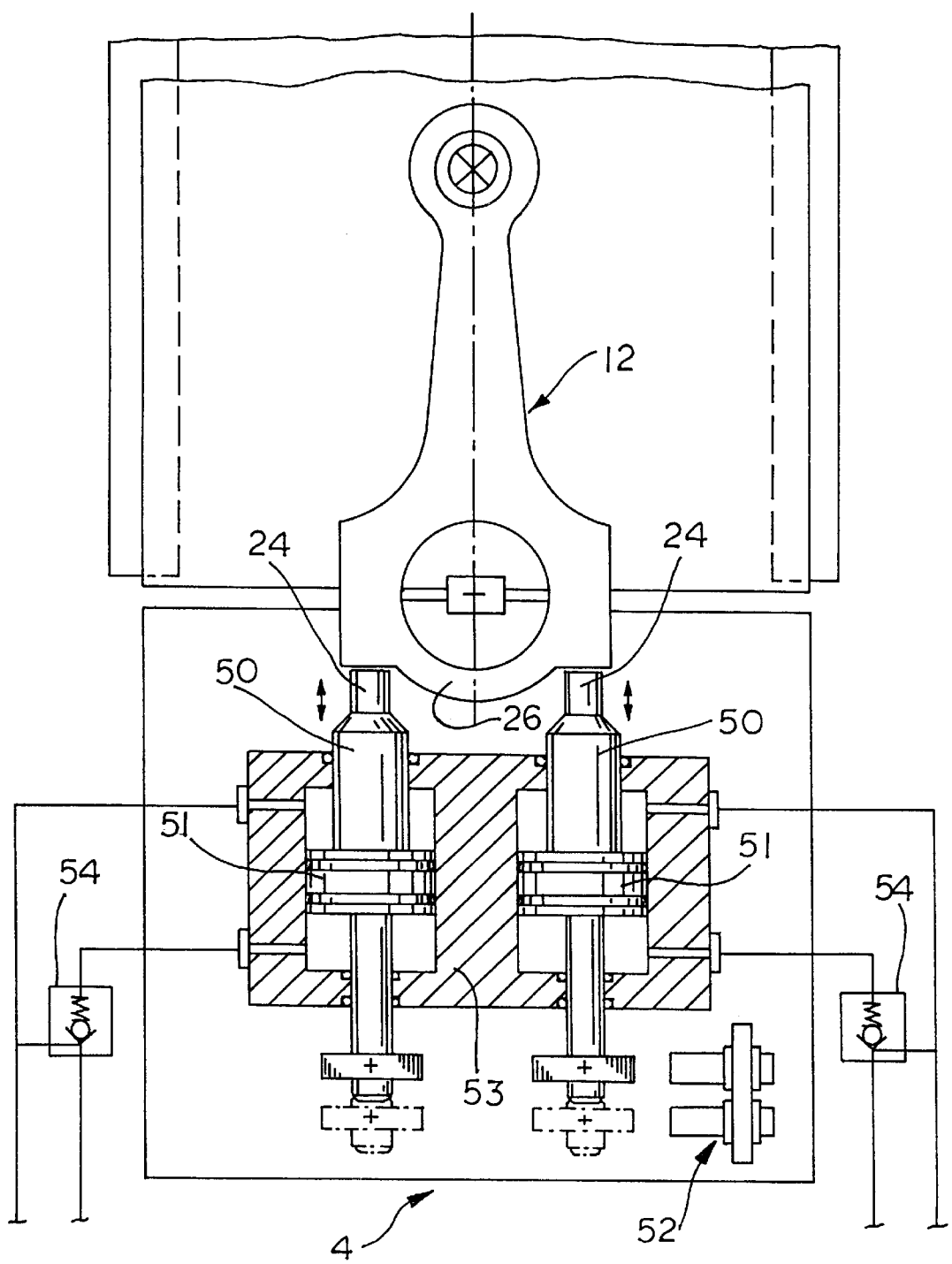
FIG. 3 is a schematic, partially sectioned plan view of a third embodiment of the apparatus in accordance with the invention.

Referring now to FIG. 3, there is illustrated a third embodiment including supporting elements 24 in the form of pins, each arranged directly at the front end of the piston rods 50 of hydraulic supporting pistons 51. The positioning of the pistons 51 is sensed by a sensor device 52 indicated only schematically in FIG. 3. The pistons rods 50 and the pistons 51 are mounted in a cylinder housing 53 arranged on the fixed part 4 of the apparatus.

During crack splitting, the supporting elements 24 are maintained in contact with the big-end cap 26 of the connecting rod 12 by a controlled hydraulic pressure. Retraction of each supporting element 24 during crack splitting is assured by a separate controlled check valve 54 sealingly arranged on the cylinder housing 53.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for crack splitting a rod and big-end cap of a connecting rod, said apparatus comprising:
    a fixed part including a fixed expander mandrel half;
    a movable part including a movable expander mandrel half, said movable part being movable in an expanding direction;
    a cleaving wedge disposed between said fixed expander mandrel half and said movable expander mandrel half, said cleaving wedge being configured for being powered in a forward direction to thereby separate said fixed expander mandrel half and said movable expander mandrel half from each other;
    a fixed supporting element disposed on said movable part and configured for supporting the rod;
    two advanceable supporting elements disposed on said fixed part and configured for supporting the big-end cap, said advanceable supporting elements also being configured for being actuated independently of each other in an advance direction; and
    two opposing wedge elements, each said advanceable supporting element contacting at least one of said two wedge elements, said wedge elements being shiftable towards and away from each other in directions transverse to the advance direction to thereby actuate said advanceable supporting elements.

2. The apparatus of claim 1, wherein said fixed part is configured for receiving the big-end cap, said movable part being configured for receiving the rod.

3. The apparatus of claim 2, wherein said fixed supporting element comprises a locating peg, the rod having a small-end bore mountable upon said peg.

4. The apparatus of claim 2, wherein the rod has a small-end with an outer surface, said fixed supporting element comprising a concave, arcuate recess connectable with at least a portion of the outer surface of the small-end.

5. The apparatus of claim 1, wherein each of said wedge elements has a wedge surface with an identical angle of attack.

6. The apparatus of claim 5, further comprising a clocked transport device configured for supporting the connecting rod before the connecting rod is lifted therefrom for insertion into engagement with said fixed expander mandrel half and said movable expander mandrel half, said clocked transport device also being configured for supporting the connecting rod after the connecting rod has been crack split and lowered into said clocked transport device.

7. The apparatus of claim 5, wherein each said advanceable supporting element includes a first width and a rear end configured for facing away from the big-end cap, said apparatus further comprising two contact pieces, each said contact piece interconnecting a respective said advanceable supporting element and a respective said wedge surface, each said contact piece having a second width larger than said first width of said respective advanceable supporting element.

8. The apparatus of claim 7, wherein each said contact piece is in sliding contact with said respective wedge surface.

9. The apparatus of claim 1, further comprising:
    a baseframe; and
    a plurality of shock absorbers attached to said baseframe, at least one of said shock absorbers being attached to said fixed part, at least one other of said shock absorbers being attached to said movable part.

10. The apparatus of claim 1, further comprising a transport device configured for downwardly inserting the connecting rod into engagement with said fixed expander mandrel half and said movable expander mandrel half, said transport device also being configured for upwardly removing the connecting rod out of engagement with said fixed expander mandrel half and said movable expander mandrel half.

11. The apparatus of claim 1, wherein the connecting rod has a longitudinal axis, said fixed part having a recess oriented substantially perpendicular to the longitudinal axis of said connecting rod, said recess having a surface supporting said wedge elements such that said wedge elements are shiftingly held within said recess.

12. The apparatus of claim 1, further comprising a hydraulic cylinder configured for powering each of said wedge elements.

13. The apparatus of claim 1, wherein the connecting rod has a longitudinal axis, said fixed part having a surface as least partially defining a recess oriented substantially perpendicular to the longitudinal axis of said connecting rod, said surface supporting said wedge elements such that said wedge elements are slidably mounted within said recess.

14. The apparatus of claim 5, wherein each said advanceable supporting element includes a rear end configured for facing away from the big-end cap, said apparatus further comprising two contact pieces, each said contact piece interconnecting a respective said rear end of a respective said advanceable supporting element and a respective said wedge surface.

15. The apparatus of claim 14, wherein each said contact piece is configured for slidably contacting said respective wedge surface.

16. The apparatus of claim 1, further comprising a joint hydraulic cylinder configured for driving each of said wedge elements.

17. An apparatus for crack splitting a rod and big-end cap of a connecting rod, said apparatus comprising:

a fixed part including a fixed expander mandrel half;

a movable part including a movable expander mandrel half, said movable part being movable in an expanding direction;

a cleaving wedge disposed between said fixed expander mandrel half and said movable expander mandrel half, said cleaving wedge being configured for being powered in a forward direction to thereby separate said fixed expander mandrel half and said movable expander mandrel half from each other;

a fixed supporting element disposed on said movable part and configured for supporting the rod;

two advanceable supporting elements disposed on said fixed part and configured for supporting the big-end cap, said advanceable supporting elements also being configured for being actuated in an advance direction;

two opposing wedge elements, each said advanceable supporting element contacting at least one of said two wedge elements, said wedge elements being shiftable towards and away from each other in directions transverse to the advance direction to thereby actuate said advanceable supporting elements, each of said wedge elements having a wedge surface with an identical angle of attack, said wedge surfaces being opposingly inclined; and a hydraulic cylinder with a face and a piston, said face cooperating with one said wedge element, said piston cooperating with an other said wedge element.

* * * * *